United States Patent [19]

Saegusa et al.

[11] Patent Number: 5,001,207
[45] Date of Patent: Mar. 19, 1991

[54] POLYETHER-POLYAMIDE BLOCK COPOLYMER AND POLYETHER PREPOLYMER

[75] Inventors: Takeo Saegusa, Kyoto; Masahiro Niwano, Ehime; Takenobu Kanazawa, Shizuoka, all of Japan

[73] Assignee: Sumitomo Chemical Company, Limited, Osaka, Japan

[21] Appl. No.: 504,701

[22] Filed: Apr. 5, 1990

Related U.S. Application Data

[63] Continuation of Ser. No. 282,891, Dec. 12, 1988, abandoned, which is a continuation of Ser. No. 197,253, May 23, 1988, abandoned.

[30] Foreign Application Priority Data

May 22, 1987 [JP] Japan .................. 62-126795

[51] Int. Cl.$^5$ .................................... C08G 18/10
[52] U.S. Cl. .................... 528/49; 528/59; 528/61; 528/73; 528/75; 528/323; 528/325
[58] Field of Search ............ 528/49, 59, 61, 62, 528/65, 66, 73, 75, 323, 325, 326, 328, 335, 345

[56] References Cited

FOREIGN PATENT DOCUMENTS 0134616 3/1985 European Pat. Off. .
0158393 10/1985 European Pat. Off. .
1292865 2/1969 United Kingdom .

Primary Examiner—Maurice J. Welsh
Attorney, Agent, or Firm—Sughrue, Mion, Zinn, Macpeak & Seas

[57] ABSTRACT

A polyether-polyamide block copolymer having an ethylenically unsaturated group represented by formula (I):

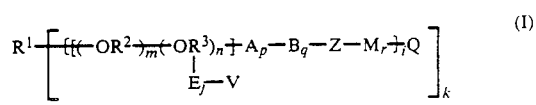

wherein symbols are as defined in the specification; and a polyether prepolymer represented by formula (II):

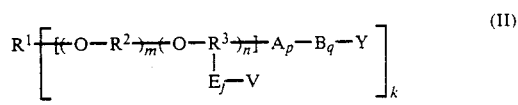

wherein the symbols are as defined in the specification, which is a starting material for synthesizing the above polyether-polyamide block copolymer, are disclosed. The polyether-polyamide block copolymer exhibits improved heat stability while retaining excellent characteristics inherent to polyether-polyamide.

7 Claims, 2 Drawing Sheets

POLYETHER-POLYAMIDE BLOCK COPOLYMER AND POLYETHER PREPOLYMER

This is a continuation of application Ser. No. 07/282,891, filed on Dec. 12, 1988 which is a continuation application of application Ser. No. 07/197,253 (both now abandoned), filed on May 23, 1988.

FIELD OF THE INVENTION

This invention relates to a polyether-polyamide block copolymer. More particularly, it relates to a polyether-polyamide block copolymer having improved heat stability while retaining excellent characteristics as a thermoplastic elastomer. This invention further relates to a polyether prepolymer having an ethylenically unsaturated group in the polyether molecular chain and thereby capable of suppressing deterioration due to oxygen or heat.

BACKGROUND OF THE INVENTION

Polyether-polyamide composed of a polyether moiety and a polyamide moiety is excellent in oil resistance and low-temperature impact resistance, and its application as an engineering thermoplastic elastomer has been increasingly broadened.

One of disadvantages of the polyether-polyamide is that the polyether moiety is liable to deterioration by oxidation. As a result, the main chain is cut to reduce the molecular weight, which leads to reduced mechanical properties.

Further, it is known that heating of polyether-polyamide to high temperatures for melt molding causes disadvantages, such as foaming, coloring, and surface roughening of molded articles.

Attempts have been made to minimize these disadvantages of polyether-polyamide by addition of a stabilizer as disclosed in Japanese Patent Application (OPI) Nos. 16756/78 and 49061/85 (the term "OPI" as used herein means "unexamined published Japanese Patent application", but it is also known that these techniques have their own limits.

In order to essentially solve the problems, block polyester-polyamide has been proposed, in which the polyether moiety of polyether-polyamide is replaced with a polymer having similar properties, such as an aliphatic polyester.

However, mere replacement of the polyether moiety of polyether-polyamide with a polyester to form block polyester-polyamide results in deterioration of water resistance. Besides, when the block polyester-polyamide contacts with a water content, it cannot hold its initial block copolymer structure composed of a polyester moiety and a polyamide moiety due to ester-amide exchange reaction during melt molding and, in some cases, eventually changes to a random copolymer. Such being the case, the polyester-polyamide does not maintain properties as a thermoplastic elastomer any more.

SUMMARY OF THE INVENTION

One object of this invention is to provide a polyether-polyamide block copolymer having the structure of polyether-polyamide substantially unchanged, which exhibits greatly improved heat stability while retaining excellent characteristics inherent to polyether-polyamide.

Another object of this invention is to provide a polyether prepolymer useful as a starting material for producing the above-described polyether-polyamide block copolymer.

The present invention relates to a polyether-polyamide block copolymer having an ethylenically unsaturated group, represented by formula (I):

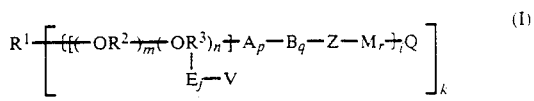

wherein $R^1$ represents a hydrogen atom, a k-valent saturated or ethylenically unsaturated aliphatic hydrocarbon group; $R^2$ and $R^3$ each represents an aliphatic hydrocarbon chain having from 2 to 6 carbon atoms; A represents —OOC— or —OOC—NH—; B represents an aliphatic hydrocarbon chain having from 1 to 18 carbon atoms or an aliphatic hydrocarbon chain having from 1 to 18 carbon atoms containing any one of —NH—CO—NH—, —NH—COO—, and —NH —CO—; Z represents a group selected from —CO—, —NH—CO—, and —OCO—; M represents —NH—R$^4$—CO— or —NH—R$^5$—NH—CO—R$^6$—CO, wherein $R^4$, $R^5$, and $R^6$ each represents a hydrocarbon chain having from 2 to 18 carbon atoms; Q represents —OR$^7$,

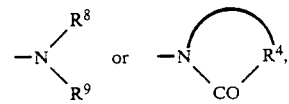

wherein $R^7$, $R^8$, and $R^9$ each represents a hydrogen atom or a hydrocarbon group having from 1 to 18 carbon atoms, and $R^4$ is as defined above; E represents an aliphatic hydrocarbon chain, an aliphatic ether chain or an aliphatic ester chain each having from 1 to 12 carbon atoms; V represents an ethylenically unsaturated group

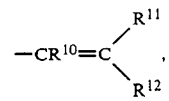

wherein $R^{10}$, $R^{11}$, and $R^{12}$ each represents a hydrogen atom or an aliphatic hydrocarbon group having from 1 to 4 carbon atoms; k represents an integer of from 1 to 6; m represents an integer of not more than 140; and includes 0 when $R^1$ is an ethylenically unsaturated aliphatic hydrocarbon group; n represents an integer of from 1 to 140; m+n is an integer of from 7 to 140; j, p, and q each represents 0 or 1; i represents an integer of from 1 to 1000; and r represents an integer of from 5 to 500.

The present invention further relates to a polyether prepolymer having a functional group selected from an isocyanate group, a carbamoyl lactam group, an acid chloride group, a carbonyl lactam group, and an oxycarbonyl lactam group at the terminal thereof and an ethylenically unsaturated group, represented by formula (II):

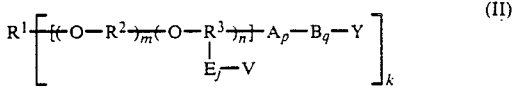

(II)

wherein $R^1$, $R^2$, $R^3$, A, B, E, V, m, n, j, k, p, and q are as defined above; Y represents a group selected from an isocyanate group, a carbamoyl lactam group, an acid chloride group, a carbonyl lactam group, and an oxycarbonyl lactam group; and the order of two ether units is not critical.

BRIEF DESCRIPTION OF THE ACCOMPANYING DRAWING

FIG. 1 is a proton nuclear magnetic resonance spectrum of the prepolymer obtained in Example 1. Assignment of each hydrogen (H) in the spectrum is as follows.

| | |
|---|---|
| 1.10 and 1.16 ppm (doublet) | c |
| 1.73 ppm | k |
| 2.25 to 2.75 ppm | l |
| 3.1 to 3.7 ppm | a, b, d, e, and f |
| 3.75 to 3.9 ppm | j |
| 3.96 and 4.02 ppm (doublet) | g |
| 5.05 to 5.4 ppm | i |
| 5.6 to 6.07 ppm | h |
| 0.82 and 1.45 ppm | spinning side band |
| 7.3 ppm | hydrogen of deuterochloroform |

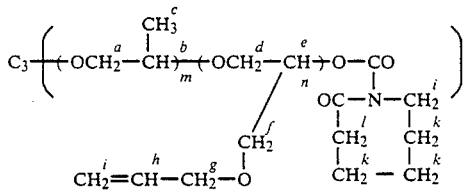

FIG. 2 is a proton nuclear magnetic resonance spectrum of the polyether-polyamide block copolymer prepared in Example 6. Assignment of each hydrogen (H) in the spectrum is as follows.

| | |
|---|---|
| 1.33 ppm (doublet) | c |
| 1.45 to 2.1 ppm | l |
| 2.5 to 2.9 ppm | m |
| 3.3 to 3.7 ppm | k |
| 3.7 to 4.2 ppm | a, b, d, e, and f |
| 4.3 ppm (doublet) | g |
| 5.3 to 5.55 ppm | i |
| 5.8 to 6.1 ppm | h |
| 8.7 ppm | j |

DETAILED DESCRIPTION OF THE INVENTION

Figure 1:
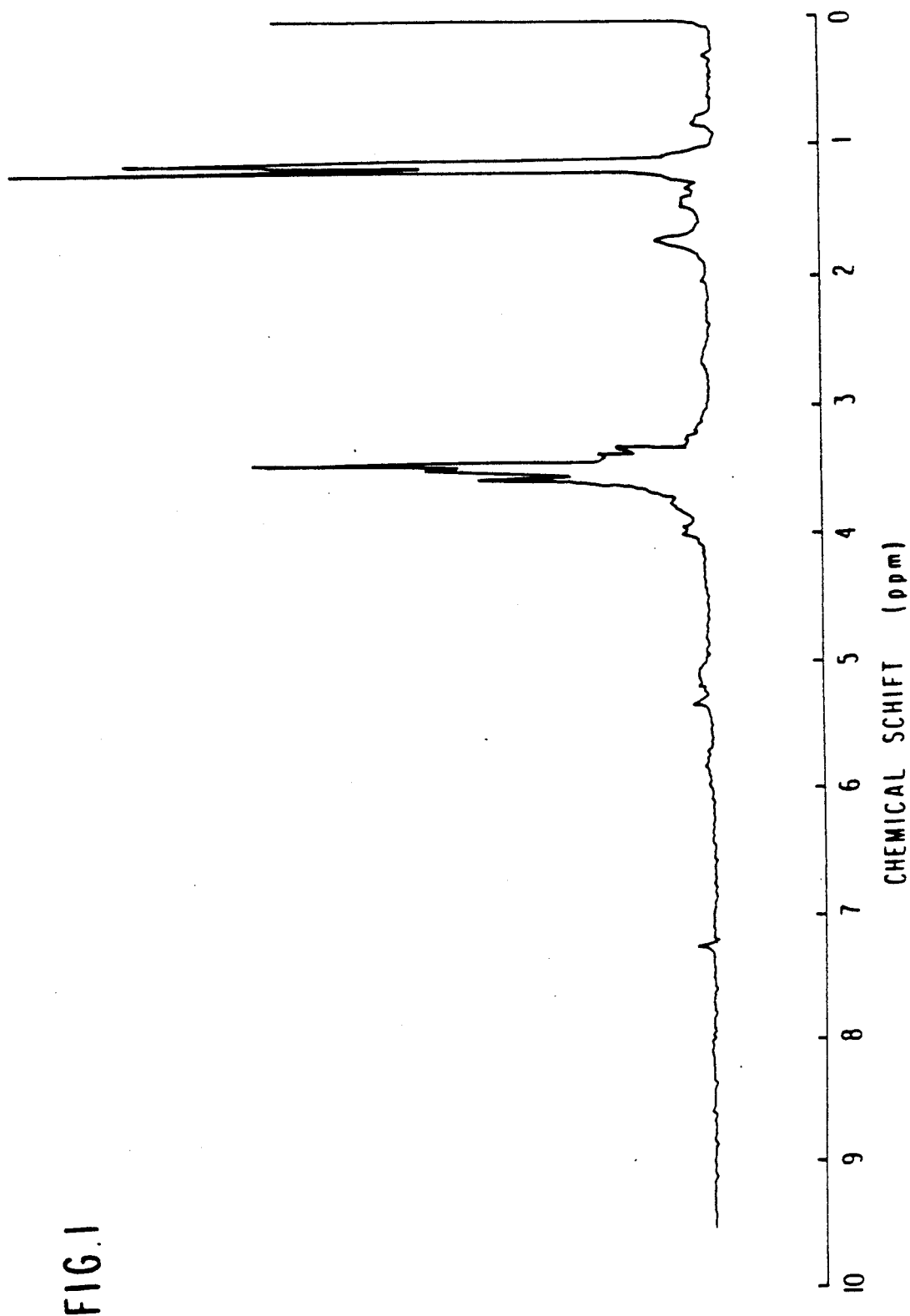

The polyether-polyamide having an ethylenically unsaturated group according to the present invention is a block copolymer comprising a polyether moiety having an ethylenically unsaturated group in its molecular and a polyamide moiety, said polyether and polyamide moieties being linked in blocks. The block copolymer may be an A-B block copolymer, an A-B-A block copolymer, or a multiblock copolymer. The weight ratio of the polyether moiety to the polyamide moiety ranges from 10:90 to 80:20.

The polyether moiety having an ethylenically unsaturated group in the molecule thereof is a moiety comprising from 7 to 140 ether units in total which has an ethylenically unsaturated aliphatic hydrocarbon group at the starting point thereof and/or an ether unit having an ethylenically unsaturated group in the molecular chain thereof.

If the total number of the ether repeating units is less than 7, the moiety fails to show characteristics of polyether. If it exceeds 140, the moiety is hardly linked to a polyamide moiety.

With respect to the polyether having an ethylenically unsaturated group in its molecule, the ethylenically unsaturated aliphatic hydrocarbon group as represented by $R^1$, the starting point of the polyether, includes a terminal olefin structure and an internal olefin structure, and/or the polyether is a random or block copolymer comprising an ether unit having an ethylenically unsaturated group in its branch and an ether unit having no ethylenically unsaturated group in its branch.

The term "ethylenically unsaturated group in branch" as used herein means an ethylenically unsaturated group per se or an ethylenically unsaturated group bonded to the polyether main chain via an ether linkage or an ester linkage.

The number of ether units each having an ethylenically unsaturated group in the branch thereof is preferably not more than a half of the total number of ether units. If it is more than that, a crosslinked structure is liable to be formed.

When $R^1$ is an ethylenically unsaturated aliphatic hydrocarbon group, the polyether moiety may not always need to contain an ether unit having an ethylenically unsaturated group in its branch.

Examples of the ethylenically unsaturated group are an allyl group, a vinyl group, a butenyl group, a pentenyl group, a styryl group, a (meth)acryloyl group, and the like.

Examples of the ether unit having an ethylenically unsaturated group are shown below.

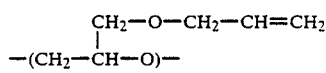

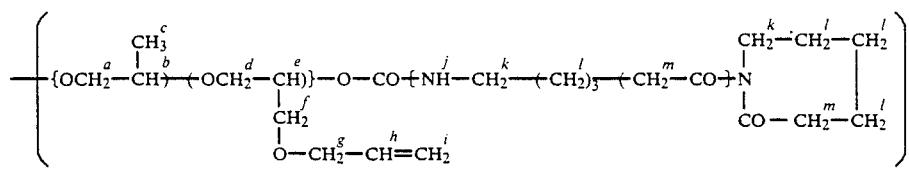

-continued

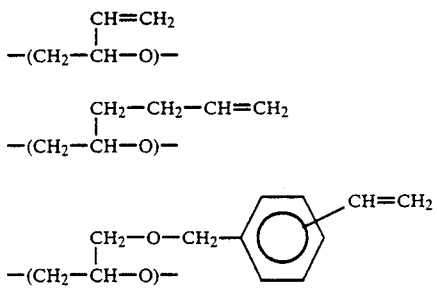

Of these, polyether having an allyl group is preferred.

The polyamide moiety in the block copolymer of the present invention may be any of those comprising a polyamide-forming component selected from a lactam, an aminocarboxylic acid, and a diamine salt of a dicarboxylic acid.

Included in such a polyamide moiety are polylactams, e.g., polybutyroamide, polycaproamide, polyenanthoamide, polyundecanoamide, polydodecanoamide, etc.; aromatic polyamides, e.g., polyaminobenzoate, etc.; condensed polyamides obtained by polycondensation of a dicarboxylic acid and a diamine, e.g., polyhexamethylene adipamide, polyhexamethylene sebacamide, polyhexamethylene terephthalamide, polydodecamethylene sebacamide, polyhexamethylene dodecanediamide, polyhexamethylene nonanediamide, polytetramethylene adipamide, polyhexamethylene succinimide, etc.; and copolymers thereof.

The polyamide moiety is composed of from 5 to 500 amide repeating units. If the number of the amide units is less than 5, the characteristics of polyamide cannot be presented. If it exceeds 500, the polyether-polyamide has too a high viscosity to obtain thin-wall molded articles.

The ratio of the polyether moiety to the polyamide moiety can be selected according to the desired properties of the polyether-polyamide. Namely, as the ratio of the polyether moiety increases, the polyether-polyamide would have increased softness; and as the ratio of the polyamide moiety increases, the polyether-polyamide would have increased hardness.

The polyether-polyamide having an ethylenically unsaturated group according to the present invention can be produced, for example, by converting a terminal hydroxyl group of a polyether(poly)ol having an ethylenically unsaturated group in the molecule thereof to a group selected from an isocyanate group, a carbamoyl lactam group, an acid chloride group, a carbonyl lactam group, and an oxycarbonyl lactam group to synthesize a prepolymer and bonding the prepolymer to a polyamide moiety by anionic polymerization of the lactam.

The number of the functional groups in the starting prepolymer for producing the polyether-polyamide is from 1 to 6, and preferably from 1 to 3.

Preferred of the above-recited functional groups is an oxycarbonyl lactam group because of its high reactivity when the prepolymer is used as a starting material for the polyether-polyamide.

The average molecular weight of the polyether prepolymer is from 500 to 30,000. If it is less than 500, the properties as polymer are not exhibited. On the other hand, if it exceeds 30,000, reactivity is reduced, and the increased viscosity causes difficulty on handling. The prepolymer has a viscosity of from 0.1 to 200 poises at 80° C. If it is less than 0.1 poise, the molecular weight is too small to exhibit expected properties as prepolymer. Viscosities exceeding 200 poises makes handling difficult as mentioned above.

In preparing the prepolymer of the present invention, an alcohol component forming $R^1$ in formula (II) and a component selected from a 1,2-epoxy compound having an unsaturated group and ..a cyclic ether are first polymerized in the presence of an anionic catalyst or a cationic catalyst to form a polyether having one or more hydroxyl groups at the terminal thereof and an ethylenically unsaturated group in the branch or at the terminal thereof.

The alcohol component forming $R^1$ includes mono- to hexavalent saturated or unsaturated aliphatic alcohols. Examples of the unsaturated aliphatic alcohols inclusive of those having an unsaturated group in the branch thereof are allyl alcohol; allyl ethers, e.g., glycerol monoallyl ether, glycerol diallyl ether, trimethylolpropane monoallyl ether, trimethylolpropane diallyl ether, pentaerythritol monoallyl ether, pentaerythritol diallyl ether, pentaerythritol triallyl ether, etc; 4-pentene-1-ol; 5-hexene-1-ol; 2-butene-1,4-diol; and so on.

When $R^1$ is a hydrogen atom, the above-described alcohol component is not needed.

The 1,2-epoxy compound having an unsaturated group
is a component forming the moiety

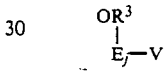

in formula (I) or (II) and is essential when the unsaturated aliphatic alcohol is not used.

Representative examples of the 1,2-epoxy compound include ally glycidyl ether, 3,4-epoxy-l-butene, 1,2-epoxy- 5-hexene, 1,2-epoxy-7-octene, glycidoxymethylstyrene, etc.

These epoxy compounds can be prepared by the method described in Sandler and Karo, *Organic Functional Group Preparation*, 99 to 116, Academic Press (1968).

The cyclic ether excludes the above-described 1,2-epoxy compounds and is a component forming (—O—$R^2$—) in formula (I) or (II). Examples of the cyclic ether to be used include ethylene oxide, propylene oxide, tetrahydrofuran, 3-methyltetrahydrofuran, etc.

A specific example of the reaction for synthesizing the polyether from a 1,2-epoxy compound having an alcoholic unsaturated group and a cyclic ether is described in T. Saegusa, *Koza Juqo Hanno Ron* (6), *Ring-Opening Polymerization* (I), 1st Ed., 113 to 180 "Polymerization of Cyclic Ethers", Kagaku Dojin Co., Ltd. (1971). According to the above reference, pp. 118 to 129, anionic polymerization using an alcohol can be carried out by once converting the alcohol into an alkali metal alcoholate and then polymerizing a 1,2-epoxy compound and a cyclic ether. Should no alcohol be used, the reaction can be effected by using, as a catalyst, an alkali metal hydroxide instead of the alkali metal alcoholate.

On simultaneously polymerizing the 1,2-epoxy compound and the cyclic ether, a random copolymer is formed. On the other hand, when either one of them is first polymerized and then the other is polymerized, a block copolymer is formed.

The method for synthesizing polyethers by cationic ring-opening polymerization is described in S. Penczek, P. Kubisa, and K. Matyjaszewski, *Advances in Polymer Science*, 68/69, "Cationic Ring-Opening Polymerization, Part II: Synthetic Applications", pp 52 to 90, Springer-Verlag (1985). It is described at pp. 80 to 85 of ibid that polytetrahydrofuran having a hydroxyl group at each of both terminals can be obtained by polymerizing tetrahydrofuran by the use of a protonic acid catalyst.

One of simple methods comprises reacting a commercially available polyether having one or more hydroxyl groups at the terminal thereof and a 1,2-epoxy compound having an unsaturated group according to the above-described method. In this case, the cyclic ether is not essential.

In order to introduce a functional group selected from an isocyanate group, a carbamoyl lactam group, an acid chloride group, a carbonyl lactam group, and an oxycarbonyl lactam group at the terminal of the thus prepared polyether, the polyether is reacted with a compound having a group capable of replacing the hydroxyl group(s) with the functional group(s).

Suitable examples of such compounds include an N-chlorocarbonyl lactam, and compounds having at least two functional groups selected from an isocyanate group, a carbamoyl lactam group, an acid chloride group, a carbonyl lactam group, and an oxycarbonyl lactam group and having a molecular weight of not more than 500.

The N-chlorocarbonyl lactam includes a compound represented by formula (III):

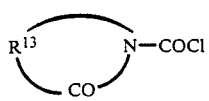

(III)

wherein $R^{13}$ represents a divalent aliphatic hydrocarbon group having from 1 to 11 carbon atoms. Preferred examples of the N-chlorocarbonyl lactam of formula (III) are N-chlorocarbonyl ε-caprolactam, N-chlorocarbonyl pyrrolidinone, and the like.

The N-chlorocarbonyl lactam is generally obtained by reacting a lactam ether and phosgene in the presence of a tertiary amine and then treating the product with hydrogen chloride gas as described in *Die Makromolecular Chemie*, Vol. 127, 34 to 53 (1969).

The reaction between the polyether having an ethylenically unsaturated group and the N-chlorocarbonyl lactam can be carried out by using from 0.6 to 1.5 mols of the N-chlorocarbonyl lactam per hydroxyl group of the polyether at a reaction temperature of from 0 to 200° C according to the method described in Japanese Patent Application (OPI) No. 179423/85.

From the viewpoints of reaction yield, suitability of the polyether prepolymer obtained for use as a starting material for polyether-polyamide, and the like, it is preferable that the N-chlorocarbonyl lactam is used in an amount of from 0.8 to 1.5 mols per hydroxyl group of the polyester and that the reaction is effected at a temperature of from 50° to 100° C. without using any catalyst or solvent.

The compound having at least two isocyanate groups in the molecule thereof which can be reacted with the polyether to introduce the functional groups include those represented by formula (IV):

$R^{14}$$NCO)_a$  (IV)

wherein $R^{14}$ represents an a-valent hydrocarbon group having from 2 to 18 carbon atoms; and a is an integer of from 2 to 4.

Examples of the compound of formula (IV) are bifunctional isocyanates, such as hexamethylene diisocyanate, tolylene diisocyanate, diphenylmethane-4,4'-diisocyanate, and isophorone diisocyanate.

The compound having at least two carbamoyl lactam groups in the molecule thereof include those represented by formula (V):

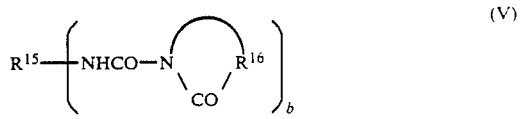

wherein $R^{15}$ represents a b-valent hydrocarbon group having from 2 to 18 Carbon atoms; $R^{16}$ represents a divalent aliphatic hydrocarbon group having from 1 to 11 carbon atoms; and b represents an integer of from 2 to 4.

The compound of formula (V) can be prepared by merely mixing an isocyanate and a lactam. Examples of these compounds are reaction products of a bifunctional isocyanate (e.g., hexamethylene diisocyanate, tolylene diisocyanate, diphenylmethane-4,4'-diisocyanate, and isophorone diisocyanate) and ε-caprolactam or pyrrolidinone.

The compound having at least two acid chloride groups in the molecule thereof include those represented by formula (VI):

$R^{17}$$COCl)_c$  (VI)

wherein $R^{17}$ represents a c-valent hydrocarbon group having from 1 to 18 carbon atoms; and c represents an integer of from 2 to 4.

Examples of the compound of formula (VI) are terephthaloyl chloride, adipoyl chloride, oxalyl chloride, isophthaloyl chloride, etc.

The compound having at least two carbonyl lactam groups in the molecule thereof include those represented by formula (VII):

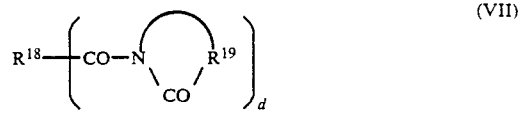

wherein $R^{18}$ represents a d-valent hydrocarbon group having from 1 to 18 carbon atoms; $R^{19}$ represents a divalent aliphatic hydrocarbon group having from 1 to 11 carbon atoms; and d represents an integer of from 2 to 4.

The compound of formula (VII) can be obtained by reacting a d-functional acid chloride and a lactam by a known method. Examples of the compound of formula (VII) are terephthaloyl biscaprolactam, adipoyl biscaprolactam, oxalyl biscaprolactam, and isophthaloyl biscaprolactam.

The compound having at least two oxycarbonyl lactam groups in the molecular thereof include those represented by formula (VIII):

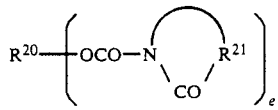

(VIII)

wherein $R^{20}$ represents an e-valent hydrocarbon group having from 2 to 18 carbon atoms; $R^{21}$ represents a divalent aliphatic hydrocarbon group having from 1 to 11 carbon atoms; and e represents an integer of from 2 to 4.

The compound of formula (VIII) can be prepared by the method described in German Patent (OLS) No. 1909577. Examples of the compound are tetramethylene-(1,4)-bis(oxycarbonylcaprolactam), cyclohexane-(1,4)bis-(oxycarbonylcaprolactam), ethylene-(1,2)-bis-(oxycarbonylcaprolactam), and the like.

The molecular weight of these bi- or polyfunctional compounds should be not more than 500 from the standpoint of ease on handling.

The amounts of the bi- or polyfunctional compounds and the polyether to be used are selected so that the number of hydroxyl groups in the polyether be from 0.4 to 0.8 per functional group. If the number of hydroxyl groups in the polyether is less than 0.4 per functional group, the excess of the functional compound should be separated by an additional operation. If it exceeds 0.8, the amount of the functional group in the resulting polyether prepolymer is too small and the viscosity of the prepolymer becomes undesirably high.

The reaction between the polyether and the functional compound can be carried out at a temperature of from 0° to 200° C., and preferably from 30° to 120° C., for a period of not more than about 10 hours.

In more detail, the reaction between the compound having at least two isocyanate groups or acid chloride groups and the polyether can be effected sufficiently by merely mixing the both.

In the case where the compound having a carbamoyl lactam group, a carbonyl lactam group or an oxycarbonyl lactam group, which is of relatively low reactivity with a hydroxyl group, is reacted, it is desirable to use a catalyst. Examples of usable catalysts include a basic catalyst for use in anionic polymerization of lactams, such as a sodium, potassium, chloromagnesium, bromomagnesium or iodomagnesium salt of ε-caprolactam, aluminum tri-ε-caprolactamate, etc. In addition, a Lewis acid catalyst may also be used. Examples of the Lewis acid catalyst include magnesium chloride, magnesium bromide, zinc chloride, zinc bromide, aluminum acetylacetonate, zinc acetylacetonate, and the like.

The catalyst is used in an amount of from 0.01 to 0.1 mol per hydroxyl group. If the amount of the catalyst is less than 0.01 mol, the reaction accelerating effect is insufficient. On the other hand, even if it is more than 0.1 mol, no further effect cannot be expected.

The above-described reaction can be performed by utilizing the method described, e.g., in Japanese Patent Application (OPI) Nos. 99128/85, 155230/85, and 158223/85 as such.

A polyether prepolymer having a carbamoyl lactam group at the terminal thereof can be obtained by reacting a polyether prepolymer having an isocyanate group at the terminal thereof with a lactam as described in Japanese Patent Application (OPI) No. 228/86.

A polyether prepolymer having a carbonyl lactam group at the terminal thereof can be obtained by reacting a polyether prepolymer having an acid chloride group at the terminal thereof with a lactam according to the method described in Japanese Patent Application (OPI) Nos. 21423/83 and 21425/83.

Linking of the thus prepared polyether prepolymer to a polyamide moiety can be carried out by anionic polymerization of a lactam starting at the above-described functional group, i.e., an isocyanate group, a carbamoyl lactam group, an acid chloride group, a carbonyl lactam group or an oxycarbonyl lactam group, in the presence of a basic catalyst simultaneously with growing of a polyamide chain. Therefore, when starting from an isocyanate group, the linking between the polyether moiety and a polyamide moiety can be effected via a urethane linkage and a urea linkage. In the case of starting from a carbamoyl lactam group, the linking can be carried out via a urethane linkage and a urea linkage.

In the case of starting from a carbonyl lactam group, the linking is effected via an ester linkage. In the case of starting from an oxycarbonyl lactam group, the bonding is effected via a urethane linkage.

In other words, A, B, and Z present between the polyether moiety and the polyamide moiety in formula (I) are determined by the kind of the functional group.

The lactam to be polymerized preferably includes 2-pyrrolidinone, ε-caprolactam, enantholactam, ω-dodecanolactam, etc.

Any of generally known basic catalysts may be used in the anionic polymerization. Specific examples of the known basic catalysts are alkali metals or alkaline earth metals, hydrides (e.g., sodium hydride, potassium hydride, etc.), oxides, carbonates or alkoxides of these metals, Grignard reagents, and reaction products of these metals or metal compounds with a lactam, e.g., a sodium, potassium, chloromagnesium, bromomagnesium or iodomagnesium salt of ε-caprolactam.

Preferred among them are hydrides of alkali metals and the reaction products of the metal compound and a lactam, such as sodium hydride and a sodium, bromomagnesium or iodomagnesium salt of a lactam.

The ratio of the lactam charged to the polyether having an ethylenically unsaturated group charged is approximately equal to the ratio of the polyamide moiety to the polyether moiety of the resulting polyether-polyamide and can be altered arbitrarily.

The basic catalyst for polymerization is used in an amount of from 0.001 to 0.2 mol per mol of the lactam. If the amount of the catalyst is less than 0.001 mol, polymerization of the lactam does not proceed sufficiently. Even if it exceeds 0.2 mol, no significant effect cannot be expected any more.

The anionic block copolymerization of the lactam can be carried out according to the commonly known methods, such as a suspension polymerization method in which polymerization is effected in an organic solvent in which the lactam is insoluble or sparingly soluble in the presence of a dispersion assistant suitable for the reactants as disclosed in Japanese Patent Publication No. 10636/61, a low-temperature bulk polymerization method as disclosed in Japanese Patent Application (OPI) No. 112825/85, and a method in which melt-bulk polymerization is conducted in an extruder as disclosed in Japanese Patent Application (OPI) No. 30796/73.

The terminal group of the thus obtained polyether-polyamide corresponds to the lactam used.

In some cases, in order to stabilize the terminal group, the polyether-polyamide may be treated with ammonia, a primary or secondary amine having a hydrocarbon group having from 1 to 18 carbon atoms, such as an alkylamine (e.g., methylamine and dimethylamine), or an aromatic amine (e.g., benzylamine, aniline, toluidine, and anisidine) at room temperature. In these cases, the terminal group is represented by

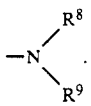

Another process for producing the polyether-polyamide having an ethylenically unsaturated group as represented by formula (I) comprises reacting a polyether polyol having an ethylenically unsaturated group in the molecule thereof with an organic dicarboxylic acid or an ester thereof, and a polyamide-forming component selected from a lactam, an aminocarboxylic acid, and a diamine salt of a dicarboxylic acid. According to this process, the polyamide moiety and the polyether moiety are linked via an ester linkage formed by condensation of the both moieties.

The organic dicarboxylic acid to be used is not particularly limited and preferably includes malonic acid, succinic acid, adipic acid, sebacic acid, dodecanedioic acid, nonanedioic acid, terephthalic acid, metaphthalic acid, naphthoic acid, 1,4-cyclohexanedicarboxylic acid, 1,3-cyclohexanedicarboxylic acid, etc.

The ester of the dicarboxylic acid includes mono- or diesters with an alcohol having from 1 to 18 carbon atoms.

Examples of the lactam are the same as enumerated before.

The aminocarboxylic acid to be used includes 6-aminocaproic acid, 11-aminoundecanoic acid, 12-aminododecanoic acid, aminobenzoic acid, etc.

The diamine salt of a dicarboxylic acid includes hexamethylenediamine adipate, hexamethylenediamine sebacate, hexamethylenediamine terephthalate, hexamethylenediamine metaphthalate, dodecamethylenediamine sebacate, hexamethylenediamine dodecanedioate, hexamethylenediamine nonanedioate, tetramethylenediamine adipate, hexamethylenediamine succinate, etc.

These polyamide-forming components may be used either individually or in combinations thereof.

The reaction can be carried out in a known manner. For example, Japanese Patent Application (OPI) No. 119997/78 discloses a process for producing polyether ester-polyamide by mixing a polyether, a dicarboxylic acid, and a polyamide-forming compound to effect copolycondensation.

Further, Japanese Patent Application (OPI) Nos. 47430/81, 189228/83, 110724/85, and 170624/85, etc. disclose a process for producing polyether ester-polyamide in which a terminal dicarboxylic acid polyamide oligomer and a polyether polyol are subjected to polycondensation, wherein the terminal dicarboxylic acid polyamide oligomer is obtained by condensation of a dicarboxylic acid and a diamine or reacting a lactam and a dicarboxylic acid. It is also described that use of a catalyst, such as a tetraalkyl titanate, an organic tin compound, etc. is effective for the polycondensation.

The polyamide terminal of the resulting polyether ester-polyamide contains a hydroxyl group or a group OR derived from the carboxylic acid or an ester thereof.

The polyether-polyamide according to the present invention can be rendered thermally stable while retaining softness and low-temperature characteristics owing to the ethylenically unsaturated group present in the polyether moiety thereof.

Conventional polyether-polyamides have encountered difficulty in obtaining a molded article of complicated shape since a molding temperature cannot be so raised due to insufficient heat stability. To the contrary, the present invention makes it possible to mold the polyether-polyamide at an increased temperature enough to obtain a molded article having a complicated shape.

The present invention is now illustrated in greater detail with reference to Examples. In these examples, the structure of the polyether-polyamide block copolymer and the polyether prepolymer were determined by a proton nuclear magnetic resonance (NMR) spectroscopy using an NMR apparatus (Hitachi Model R-40) and tetramethylsilane as an internal standard. The solvent used in NMR analyses was trifluoroacetic acid for the polyether-polyamide block copolymer and $CDCl_3$ for the polyether prepolymer.

EXAMPLE 1

In a 2 l-volume four-necked round flask equipped with a stirrer and a thermometer was charged 1,200 g of polyoxypropylene glycol (number average molecular weight: 2,860), and the air in the flask was purged with nitrogen.

The flask was soaked in an oil bath maintained at about 60° C., and when the inner temperature reached 60° C., stirring was started.

Then, 0.2 g of boron trifluoride-ethyl etherate was added, the mixture was made uniform, and 96.0 g of allyl glycidyl ether was then added thereto at once. The temperature temporarily reached 80° C. by the heat of reaction. At the temperature of 60° C., stirring was further continued for an additional 2 hours. At 80° C., while introducing nitrogen, 148.0 g of N-chlorocarbonyl caprolactam was added to the reaction mixture at once, followed by mixing. At that temperature, stirring was continued for an additional 5 hours.

After the reaction mixture was adjusted to 100° C., the pressure was reduced by the use of a vacuum pump, followed by blowing dry nitrogen thereinto to remove a by-product hydrogen chloride. This operation was continued for 5 hours, and the reaction mixture was then cooled to obtain 1,315 g of a polyether prepolymer having an allyl group as an ethylenically unsaturated group and an oxycarbonyl lactam group as a functional group.

An NMR spectrum of the resulting prepolymer is shown in FIG. 1.

EXAMPLE 2

The same procedure of Example 1 was repeated, except that the polyoxypropylene glycol was replaced with polyoxytetramethylene glycol (number average molecular weight: 2,850), to obtain 1,316 g of a polyether prepolymer having an allyl group and, as a functional group, an oxycarbonyl caprolactam group.

An NMR spectrum of the resulting prepolymer was similar to that of Example 1 with the exceptions that the doublet at 1.10 and 1.16 ppm was a triplet at 1.6 ppm and that the multiplet at 3.9 to 3.1 ppm was a triplet at 3.4 ppm, indicating that the main chain structure was different.

EXAMPLE 3

In a pressure container were charged 25 g of propylene glycol, 16 g of a 50 wt% aqueous solution of potassium hydroxide, and 300 g of toluene. Toluene and the water content were azeotropically removed from the mixture. To the residue was slowly added a mixture of 782 g of propylene oxide and 20 g of allyl glycidyl ether in a nitrogen gas atmosphere while maintaining the mixture at a temperature between 105° C. and 110° C. by cooling. After the addition, the mixture was allowed to further react at that temperature for an additional 3 hours.

The reaction mixture was neutralized with dilute sulfuric acid and washed with distilled water several times to obtain 790 g of polyoxypropylene glycol having an allyl group and a number average molecular weight of 2,340.

The whole amount of the resulting polyoxypropylene glycol was reacted with 118.6 g of N-chlorocarbonyl caprolactam in the same manner as in Example 1 to obtain 883 g of a polyether prepolymer having an allyl group as an ethylenically unsaturated group and an oxycarbonyl lactam group as a functional group.

An NMR spectrum of the prepolymer was similar to that of Example 1.

EXAMPLE 4

In a 2 l-volume round flask equipped with a stirrer was charged 780 g of polyoxypropylene glycol having an allyl group (number average molecular weight: 2,210) as produced in the same manner as in Example 3. After replacement of the atmosphere with nitrogen, 172 g of tetramethylene-(1,4)-bis(N-oxycarbonylcaprolactam) and 7.9 g of caprolactam magnesium bromide were added thereto while stirring in a nitrogen atmosphere, and the mixture was allowed to react at 120° C. for 2 hours.

The progress of the reaction was confirmed by an increase in viscosity of the reaction mixture. There was obtained about 930 g of a polyether prepolymer having an allyl group and, as a functional group, an oxycarbonyl lactam group.

An NMR spectrum of the resulting prepolymer was approximately similar to that of Example 1.

EXAMPLE 5

In a pressure container were charged 49.3 g of 2-butene-1,4-diol, 16 g of a 50 wt% aqueous solution of potassium hydroxide, and 300 g of toluene, and the water content and toluene were azeotropically removed from the mixture. To the residue was slowly added 790 g of propylene oxide while maintaining the mixture at a temperature between 105° and 110° C. by cooling. After the addition, the reaction was further continued for an additional 3 hours at that temperature.

The reaction mixture was neutralized with dilute sulfuric acid and washed with distilled water several times to obtain 820 g of polypropylene glycol having an internal olefin linkage and a number average molecular weight of 1,500.

To a 1 l-volume round flask equipped with a stirrer whose atmosphere had been replaced with nitrogen were charged 500 g of the above-obtained polypropylene glycol having an internal olefin linkage and 117 g of N-chlorocarbonyl caprolactam, followed by allowing the mixture to react at 80° C. for 7 hours. The reaction was further continued at 100° C. for 5 hours while diminishing the pressure by means of a vacuum pump. There was obtained 580 g of a liquid polyether prepolymer.

EXAMPLE 6

In a 5 l-volume flask were charged 20 g of a 2-ethylhexyl acrylate/N,N'-dimethylaminoethyl methacrylate copolymer as a dispersion stabilizer and 3 l of isooctane. After the mixture was dissolved, the mixture was heated to the boiling point of isooctane while blowing nitrogen until about 5% of the isooctane charged was distilled off and the system became substantially water-free.

Solution (A):

In a 1 l-volume flask was charged 494 g of the same polyether prepolymer having an allyl group as produced in Example 1, and the mixture was made uniform by stirring while heating at 100° C. and passing nitrogen.

Solution (B):

In a 500 ml-volume round flask were charged 502.4 g of $\epsilon$-caprolactam and 3.6 g of sodium hydride, and the mixture was heated at 100° C. while stirring to form a uniform solution.

Solution (B) was poured into Solution (A), and the mixture was made uniform by rapidly mixing. Then, the resulting mixture was transferred to the 5 l-volume flask containing the isooctane solution described above, followed by stirring at 300 rpm. After 30 minutes, 30 g of 3-methoxypropylamine was added thereto, and the stirring at 300 rpm was continued at 100° C. for 2 hours. The slurry thus obtained was filtered and dried to obtain 860 g of a polyether-polyamide block copolymer as a powder.

The resulting copolymer (860 g) was mixed with 2,820 g of pure water and 18.8 g of acetylacetone, and the mixture was stirred at 80° C. for 3 hours, followed by filtration. The filter cake was washed with 2.5 liters of pure water and dried under reduced pressure to obtain 840 g of a copolymer.

Figure 2:
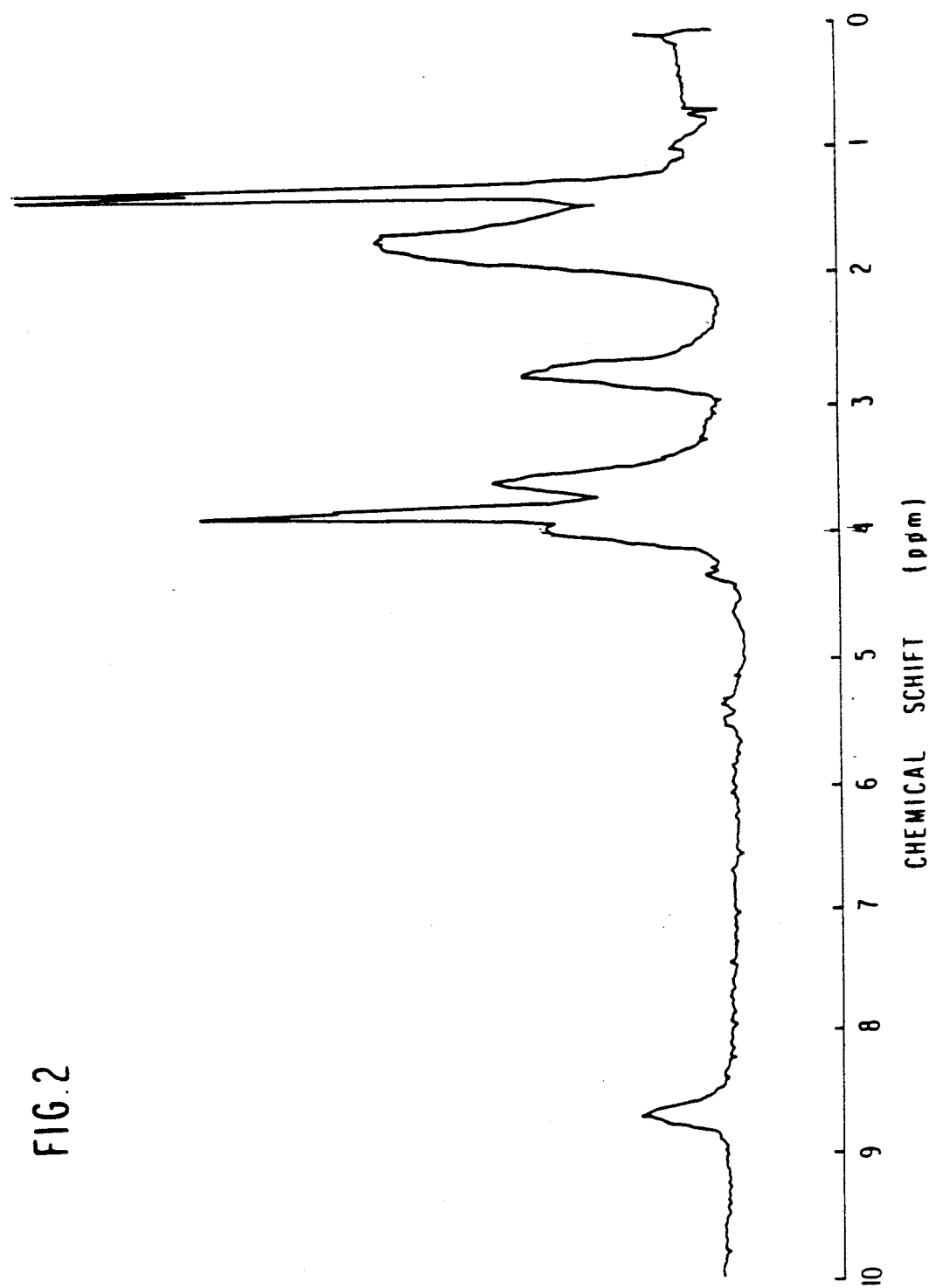

An NMR spectrum of the resulting polyether-polyamide block copolymer is shown in FIG. 2.

EXAMPLE 7

The same procedure as in Example 6 was repeated, except that 494 g of the polyether prepolymer prepared in Example 2 was used as Solution (A) and a solution of 20 g of an iodomagnesium salt of $\epsilon$-caprolactam in 486 g of $\epsilon$-caprolactam was used as Solution (B), to thereby obtain 940 g of a polyether-polyamide block copolymer having an allyl group as an ethylenically unsaturated group.

EXAMPLE 8

The same procedure as in Example 6 was repeated, except that 504 g of the polyether prepolymer prepared in Example 3 was used as Solution (A) and a solution of 3.6 g of sodium hydride in 492.4 g of $\epsilon$-caprolactam was used as Solution (B), to thereby obtain 820 g of a polyether-polyamide block copolymer having an allyl group as an ethylenically unsaturated group.

EXAMPLE 9

The same procedure as in Example 6 was repeated, except that 549 g of the polyether prepolymer prepared in Example 4 was used as Solution (A) and a solution of 3.6 g of sodium hydride in 447.4 g of $\epsilon$-caprolactam was used as Solution (B), to thereby obtain 790 g of a polyether-polyamide block copolymer having an allyl group.

EXAMPLE 10

The same procedure as in Example 6 was repeated, except that 520 g of the polyether prepolymer prepared in Example 5 was used as Solution (A) and a solution of 3.6 g of sodium hydride in 478 g of ε-caprolactam was used as Solution (B), to thereby obtain 790 g of a polyether-polyamide block copolymer having an internal olefin group as an ethylenically unsaturated group.

EXAMPLE 11

In a 2 l-volume four-necked round flask equipped with a stirrer and a thermometer were charged 250 g of dicarboxyl-6-polyamide having a number average molecular weight of 1,600, 200 g of polyoxypropylene glycol (an intermediate for the polyether prepolymer of Example 3), and 0.6 g of tetraisopropyl orthotitanate, and the mixture was heated under reduced pressure to form a solution. The solution was subsequently allowed to react at 260° C. for 5 hours to obtain a polyether-polyamide block copolymer.

COMPARATIVE EXAMPLE 1

In a 1 l-volume round flask equipped with a stirrer whose atmosphere had been replaced with nitrogen were charged 600 g of polytetramethylene glycol having a number average molecular weight of 3,000 and 70 g of N-chlorocarbonyl caprolactam, and the mixture was allowed to react at 70° C. for 10 hours. The reaction was further continued at 100° C. for an additional 5 hours while diminishing the pressure by means of a vacuum pump. There was obtained 632 g of a liquid polyether prepolymer.

The same procedure as in Example 6 was repeated, except for using 494 g of the above obtained polyether prepolymer as Solution (A), to obtain 905 g of a polyether-polyamide block copolymer.

COMPARATIVE EXAMPLE 2

In a 1 l-volume round flask equipped with a stirrer whose atmosphere had been replaced with nitrogen were charged 500 g of polypropylene glycol having a number average molecular weight of 2,000 and 70 g of N-chlorocarbonyl caprolactam, and the mixture was reacted at 80° C. for 7 hours. The reaction was further continued at 100° C. for an additional 5 hours while diminishing the pressure by the use of a vacuum pump. There was obtained 545 g of a liquid polyether prepolymer.

The same procedure as in Example 6 was repeated, except for using 494 g of the above obtained prepolymer as Solution (A) and a solution of 3.6 g of sodium hydride in 504.8 g of ε-caprolactam as Solution (B), to thereby obtain 860 g of a polyether-polyamide block copolymer.

Each of the polyether-polyamide block copolymers as obtained in Examples 6 to 11 and Comparative Examples 1 and 2 was evaluated for heat stability by determination of melt flow rate and tensile test according to the following test methods.

Four hundreds grams of each copolymer was mixed with 1 g of tetrakis[methylene-β-(3,5-di-t-butyl-4-hydroxyphenyl)propionate]methane as a stabilizer, and the mixture was pelletized by knead-extrusion in a 20 mm single screw extruder (manufactured by Toyo Seiki Co., Ltd.) under the conditions of 220° C. in first zone temperature of the cylinder, 240° C. in second zone temperature of the cylinder, 240° C. in die temperature, 70 rpm in revolution of the screw, and about 4 minutes in average residence time.

(1) Melt Flow Rate

The pellets were introduced in a melt indexer (manufactured by Takara Kogyo Co., Ltd.) and, 5 minutes later, extruded at 235° C. under a load of 1 kg for 30 seconds. The die outlet was then plugged, and the content was allowed to stand for 10 minutes while applying the load. Thereafter, the content was again extruded for 30 seconds. The output in each extrusion step (after 5 minutes, or 15 minutes, heat treatment) was measured to calculate a melt flow rate.

(2) Tensile Test

The pellets were molded into a sheet by the use of a JSW J28SC type injection molding machine (manufactured by Nippon Seiko Co., Ltd.) at a cylinder temperature of 240° C. and a mold temperature of 40° C.

The resulting sheet was processed in an air oven at 150° C. for 300 hours. Before and after the processing, the elongation at break of the sheet was determined according to ASTM D638.

The results of these tests are shown in Table 1 below.

TABLE 1

| Example No. | Melt Flow Rate (g/10 min) 5 min. | Melt Flow Rate (g/10 min) 15 min. | Elongation at Break Initial Stage % | Elongation at Break After 300 hrs. % |
|---|---|---|---|---|
| Example 6 | 12.1 | 11.9 | 390 | 370 |
| Example 7 | 1.5 | 1.4 | 410 | 390 |
| Example 8 | 20.3 | 21.5 | 440 | 360 |
| Example 9 | 5.6 | 6.3 | 290 | 230 |
| Example 10 | 20.8 | 20.4 | 400 | 370 |
| Example 11 | 24.6 | 29.1 | 310 | 260 |
| Comparative Example 1 | 1.2 | 2.8 | 400 | 280 |
| Comparative Example 2 | 12.8 | unmeasurable* | 300 | 280 |

Note:
*The melt flow rate after 15 minutes, heat treatment was unmeasurable due to foaming.

While the invention has been described in detail and with reference to specific embodiments thereof, it will be apparent to one skilled in the art that various changes and modifications can be made therein without departing from the spirit and scope thereof.

What is claimed is:

1. A polyether-polyamide block copolymer having an ethylenically unsaturated group, represented by formula (I):

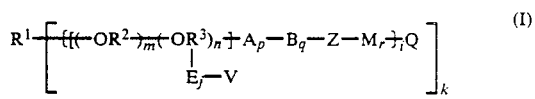

wherein $R^1$ represents a hydrogen atom, a k-valent saturated or ethylenically unsaturated aliphatic hydrocarbon group; $R^2$ and $R^3$ each represents an aliphatic hydrocarbon chain having from 2 to 6 carbon atoms; A represents —OOC— or —OOC—NH—; B represents an aliphatic hydrocarbon chain having from 1 to 18 carbon atoms or an aliphatic hydrocarbon chain having from 1 to 18 carbon atoms containing any one of —NH—CO—NH—, NH—COO—, and —NH—CO—; Z represents a group selected from —CO—, —N-

H—CO—, and —OCO—; M represents —NH—R$^4$—CO— or —NH—R$^5$—NH—CO—R$^6$—CO—, wherein R$^4$, R$^5$, and R$^6$ each represents a hydrocarbon chain having from 2 to 18 carbon atoms; Q represents —OR$^7$,

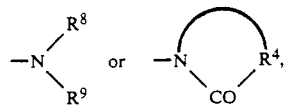

wherein R$^7$, R$^8$, and R$^9$ each represents a hydrogen atom or a hydrocarbon group having from 1 to 18 carbon atoms, and R$^4$ is as defined above; E represents an aliphatic hydrocarbon chain, an aliphatic ether chain or an aliphatic ester chain each having from 1 to 12 carbon atoms; V represents an ethylenically unsaturated group

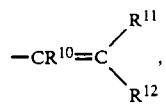

wherein R$^{10}$, R$^{11}$, and R$^{12}$ each represents a hydrogen atom or an aliphatic hydrocarbon group having from 1 to 4 carbon atoms; k represents an integer of from 1 to 6; m represents an integer of not more than 140 and includes 0 when R$^1$ is an ethylenically unsaturated aliphatic hydrocarbon group; n represents an integer of from 1 to 140; m+n is an integer of from 7 to 140; j, p, and q each represents 0 or 1; i represents an integer of from 1 to 1000; and r represents an integer of from 5 to 500.

2. A polyether-polyamide block copolymer as claimed in claim 1, wherein n is not more than a half of the total of m and n.

3. A polyether-polyamide block copolymer as claimed in claim 1, wherein said ethylenically unsaturated group is an allyl group, a vinyl group, a butenyl group, a pentenyl group, a styryl group, or a (meth)acryloyl group.

4. A polyether-polyamide block copolymer as claim in claim 1, wherein said esthetically unsaturated group is an allyl group.

5. A polyether prepolymer having a functional group selected from an isocyanate group, a carbamoyl lactam group, an acid chloride group, a carbonyl lactam group, and an oxycarbonyl lactam group at the terminal thereof and an ethylenically unsaturated group, represented by formula (II):

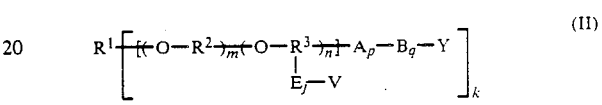

wherein R$^1$, R$^2$, R$^3$, A, B, E, V, m, n, j, k, p, and q are as defined above; Y represents a group selected from an isocyanate group, a carbamoyl lactam group, an acid chloride group, a carbonyl lactam group, and an oxycarbonyl lactam group; and the order of two ether units is not critical.

6. A polyether prepolymer as claimed in claim 5, wherein said functional group is an oxycarbonyl lactam group.

7. A polyether prepolymer as claimed in claim 5, wherein said prepolymer has an average molecular weight of from 500 to 30,000.

* * * * *